Nov. 19, 1968   R. F. KLAVER   3,412,330
APPARATUS FOR IDENTIFYING PEAK AMPLITUDES OF VARIABLE SIGNALS
Filed Jan. 9, 1967   3 Sheets-Sheet 1

INVENTOR
RUDOLF F. KLAVER
BY P. Johnston
George W. Watson
ATTORNEYS

Nov. 19, 1968 R. F. KLAVER 3,412,330
APPARATUS FOR IDENTIFYING PEAK AMPLITUDES OF VARIABLE SIGNALS
Filed Jan. 9, 1967 3 Sheets-Sheet 3

INVENTOR
RUDOLF F. KLAVER
BY
ATTORNEYS

United States Patent Office 3,412,330
Patented Nov. 19, 1968

3,412,330
APPARATUS FOR IDENTIFYING PEAK AMPLITUDES OF VARIABLE SIGNALS
Rudolf F. Klaver, 1440 Portland Ave.,
Albany, Calif. 94706
Continuation-in-part of application Ser. No. 256,064,
Feb. 4, 1963. This application Jan. 9, 1967, Ser.
No. 622,838
1 Claim. (Cl. 324—103)

ABSTRACT OF THE DISCLOSURE

An apparatus for identifying the attainment of a peak along a signal having amplitude variations with time. The amplitude of the time varying signal is continuously monitored and a measure of its amplitude is stored in a measuring device. The instantaneous value of the signal is continuously compared to the stored signal plus and minus a fixed bias signal. When the input signal is more than the stored signal plus the bias, a new measure for the stored signal is produced representing the value of the input signal. When the stored signal plus the bias is more than the input signal and a subsequent measure of the input signal minus the bias is less than the stored signal, a peak in the input signal is identified. The identification of a peak causes the last stored quantity to be transmitted to a printer to be identified as a peak on the time varying signal.

---

This application is a continuation-in-part of Ser. No. 256,064, filed Feb. 4, 1963, now abandoned.

This invention relates to a method and apparatus for identifying amplitude peaks along a continuous signal having amplitude variations with time. More particularly the invention relates to a method and apparatus for automatically generating signals representative of identified peak values along a first continuous time varying signal and concurrently generating a signal representative of the value of a second time varying signal at the time of identification of a peak in said first signal.

In the various arts where continuous signals representing different scientific phenomena are observed and studied, it is usually the specific events and the values within the continuous signals that are of importance to the observer. Generally it is desired to provide a permanent record of these specific events or values for future reference or for study. Quite often, interrelated values of two continuous signals represent the significant scientific information that the observer seeks to determine. One example of an observation of continuous signals representing scientific information is found in the art of mass spectrometry wherein qualitative and quantitative values representing various materials within a sample may be determined. In a mass spectrometer, a gaseous sample under analysis is ionized and then subjected to controlled electrostatic and/or electromagnetic fields. The ionized gas is focused into a beam and then manipulated by the controlled fields. By varying one or both of the electrostatic or electromagnetic fields, ion beams having a particular mass to charge ratio ($M/C$) can be focused to strike a collector appropriately positioned in the path of the ionized beams. The ions striking the collector cause an electrical current to flow from the collector and that current will vary in accordance with the intensity of the beams striking the collector. The magnitude of the electrical current flowing from the collector fluctuates between peaks and valleys with the peak heights within the continuous signal representing the quantities of ions at various mass charge ratios. A coincident value of the variation in the controlled fields may be used to identify the mass of the particular ions striking the collector and causing the electrical current. Selected peaks along the continuous signal may then be correlated with the value of the controlled fields at the instant of a peak to derive both a qualitative and a quantitative representation of the ion beam passing through the spectrometer. A continuously recorded and printed record of these peak heights and the values of related controlled fields furnishes one performing the mass spectrometer analysis with both the qualitative and quantitative values of the sample under analysis.

Most of the present mass spectrometers provide output records in analog form, requiring detailed and time-consuming interpretations of the values of the peak heights and their relationship to the mass-charge ratio. Some forms of apparatus are known which will automatically print out peak heights and mass numbers from information derived from a mass spectrometer, and some of these forms of apparatus will provide the information in digital form. However, many of these devices have been found to be unreliable or slow, some provide mere approximations of the actual relationship between signal peaks and time along the record, and some even require partial manual control in order to obtain records within the desired signal ranges supplied from the mass spectrometer.

An object of the present invention is a method and apparatus for the identification of signal peaks within a continuous varying signal in accordance with a novel logic program.

A further object of the present invention is to provide a simplified method and apparatus for automatically digitizing amplitude values within two continuous signals and for printing representations of legitimate peak signal variations in a first of the continuous signals along with the instantaneous value of a second of the continuous signals related to the first signal.

Further objects and features of the invention will be readily apparent to those skilled in the art from the specification and appended drawings illustrating a certain preferred embodiment in which.

The method and apparatus of the present invention are capable of handling input data from many different processes. As here illustrated and described the invention is related to a mass spectrometer. It should be understood, however, that the invention is not restricted to the illustrated use.

Figure 1:
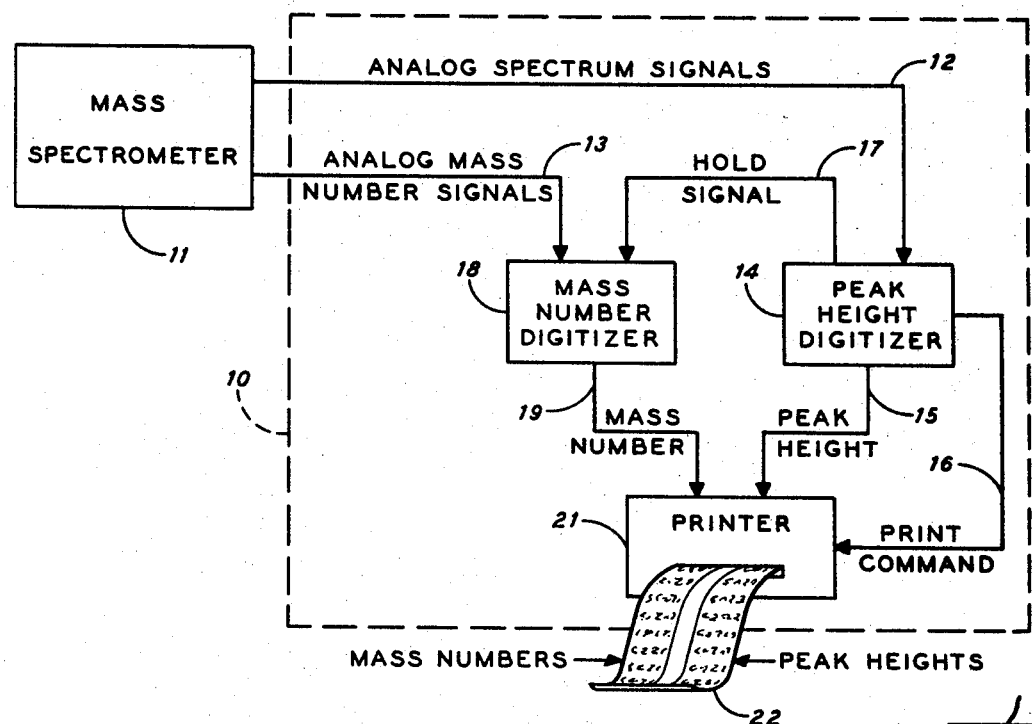
FIG. 1 is a simplified block diagram of a function that can be performed by the method and apparatus of the present invention.

In FIG. 1, the present invention is illustrated as part of the mass spectrum digitizer generally enclosed within the dotted lines 10. While not necessarily restricted to being energized in or from any particular signal source, the digitizer is illustrated as being connected to a mass spectrometer 11 having a first signal or analog spectrum signal output at 12 and a second signal or analog mass number signal output at 13. The analog spectrum signal is supplied to a peak height digitizer 14 where the analog spectrum signals are digitized, or converted to digital signals, and where a peak along the analog signal is identified. Digital peak height signals are supplied at its output on conductor 15. The peak height digitizer further supplies a print command on conductor 16 whenever a peak is identified in the analog signal. A further output is provided from the digitizer on conductor 17 identified as a hold signal to maintain an associated piece of equipment in one fixed condition until the peak height digitizer has provided a second command signal.

The analog mass number signals are supplied to a mass number digitizer 18 where the analog input signals are converted to digital output signals on conductor 19. In the apparatus as illustrated in FIG. 1 the hold signal on conductor 17 from the peak height digitizer is supplied to the mass number digitizer, simultaneously with the print command signal on conductor 16, to hold it in a fixed position until the value that its digitizer has attained has been transferred for recording.

The two digital signals from the digitizers 14 and 18 are supplied to a printer 21 where the digital input signals are converted to visual signals on parallel columns of a paper tape such as illustrated at 22. The printer is actuated to print a parallel column of digital numbers on receiving a print command on conductor 16 from the digitizer 14. It should be understood that with commercially available equipment the signals way also be recorded by other forms of digital recorders such as cards, paper tape or magnetic tape.

In the simplified form as illustrated in FIG. 1 the peak height digitizer of the present invention is capable of taking two input signals from one or more energizing devices and separately converting these signals to digital form for energization of a printing device so as to produce a visible output record of the variations within the two input analog signals. In the present invention a novel cooperation of logic circuits is employed to identify the existence of a peak within one of the analog signals so that the identification of a peak in that signal may be employed to actuate a printing device to cause separate records of each of the digitized quantities to be printed. The logic circuits and their manner of interconnection are illustrated in FIG. 2 where the elements of the mass spectrum digitizer are separated by dotted lines and identified, where applicable, by the same characters appearing in FIG. 1.

The peak height digitizer 14 includes a summing junction at 23, a comparator 24, a logic circuit 25, a digital to analog converter and digital storage device 26 with associated interconnecting and gating circuits, to be later described, for producing an output signal at conductor 15 to the printer 21. The mass number digitizer 18 is illustrated as including a ratiometer 27 for converting the input analog signal to an output digital signal on conductor 19 for supply to the printer 21. The hold signal conductor 17 interconnecting the two digitizers 14 and 18 is illustrated as well as the print command signal conductor 16 for actuation of the printer 21.

Figure 3:
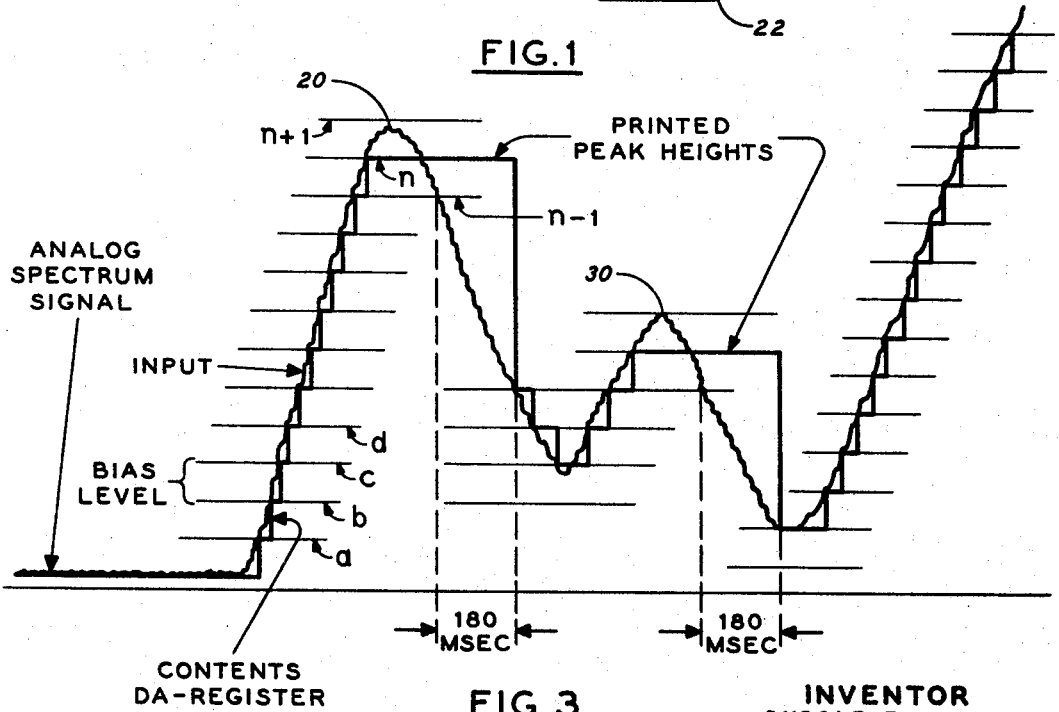
FIG. 3 is an illustration of the procedure followed by the apparatus of FIG. 2 for identifying signal peaks along a varying amplitude analog signal.
Figure 2:
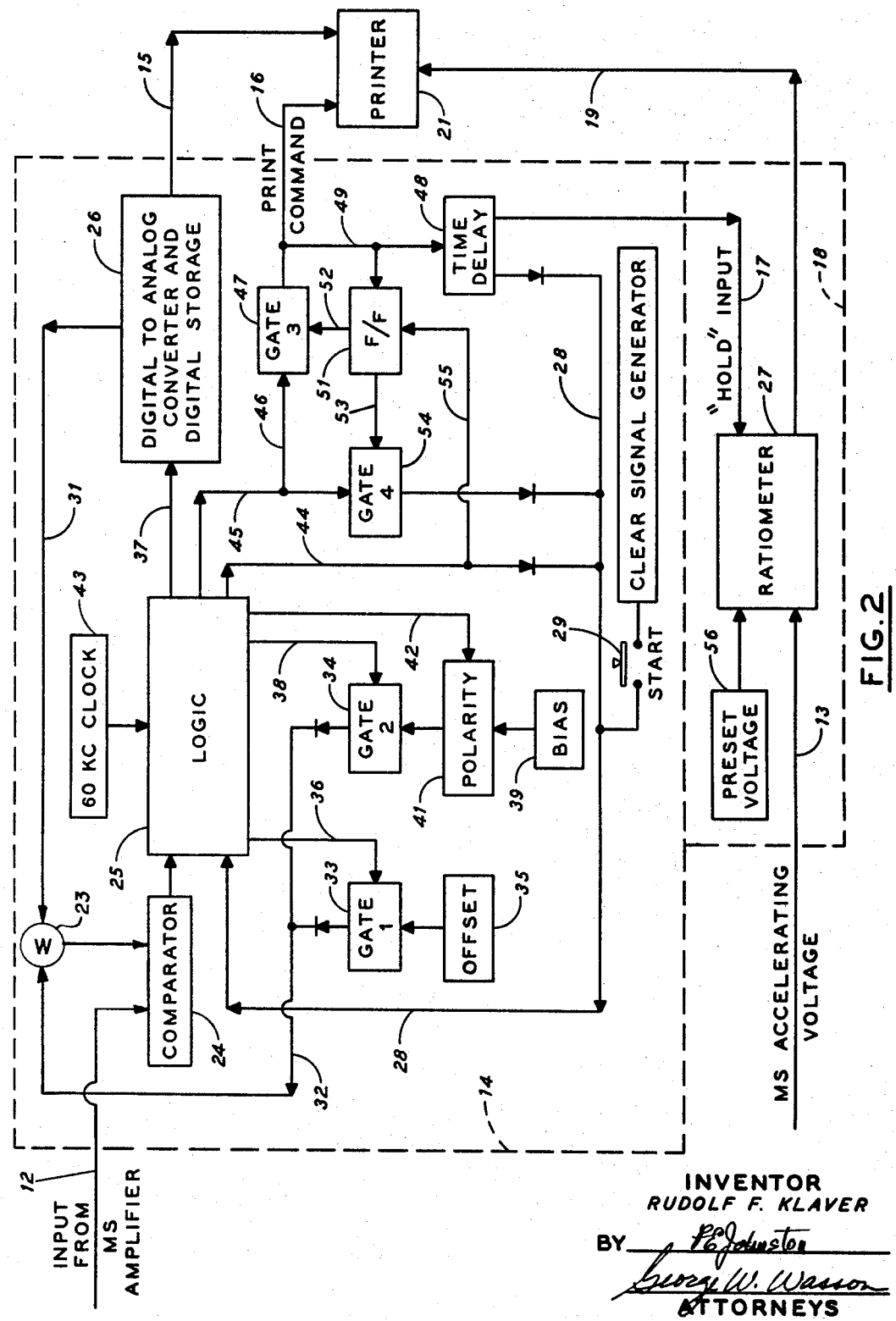
FIG. 2 is an expanded block diagram illustration of the circuits and their interconnections as employed in the present invention to perform the function illustrated in FIG. 1.

The peak height digitizer 14 of FIGS. 1 and 2 is intended to perform the function illustrated in FIG. 3. In that figure an analog spectrum signal is illustrated as having several amplitude variations including peaks attained at 20 and 30 to be converted to digital form by a comparison operation in a series of steps along the signal. The digitizer must first sort input noise or signals smaller than a preset level from desired signals. This function is performed by inserting a predetermined "offset" signal level. The digitizer then systematically follows signal variations and repeatedly performs a digitization of the input signal as the input exceeds previously stored digital quantities. False signal peaks due to small noise signals, inherent in the input signal, are eliminated by requiring the input signal to exceed the stored signal by a bias quantity larger than the noise signals.

In the procedure illustrated in FIG. 3, at each point $a$, $b$, $c$, $d$, etc., the contents of the digital to analog storage register are fixed and the analog input signal is continuously compared with the algebraic sum of the stored signal and a bias signal. The bias signal is repeatedly alternated in polarity. As long as the analog signal differs less than the bias from the stored quantity no other action than continuously alternating the bias polarity is taken and the digital to analog storage does not change its contents, as for instance between points $b$ and $c$. If the input analog signal increases to point $c$, however, this signal becomes larger than the stored quantity $b$ plus the bias and the digital voltmeter will make a complete new conversion ending with a stored quantity equal to the input signal at point $c$ (assuming that the rate of rise of the input signal is relatively low as compared with the conversion rate of the digital voltmeter).

The above described process will repeat itself until, as illustrated at a comparison identified as $n-1$, the analog signal becomes less than the stored digital signal minus the bias. When that condition has been identified, a print command signal is transmitted from the peak height digitizer and the printer 21 will be commanded to record digital quantities. During the printing period the digitizer will be given a hold signal to prevent a digital change before the recording has been completed. It should be noted that a peak is detected and a print command supplied only when the logic circuit identifies an analog signal less than the last stored digital quantity minus the bias preceded by an analog signal larger than the last stored digital quantity.

After the prescribed hold period has expired, the input analog signal is again digitized and stored and then compared to the stored signal plus and minus bias during which time no print command pulses are generated on line 16 until the input analog signal changes its direction of slope and begins to exceed the last stored quantity plus the bias. The apparatus of the present invention then again makes the comparison between the analog signal and the stored signal with the bias signal until the next peak is identified in the same manner that the previous peak was identified. With each sensed peak, a print command is supplied from the converter and storage 26 to the printer 21 to again record the digitized quantities.

The apparatus for the identification of a peak along an input analog signal in the manner illustrated in FIG. 3 will now be described. To initiate operation of the digitizer, a start pulse should be supplied on conductor 28 through normally open pushbutton switch 29 to clear the system. In FIG. 2 an input analog signal is supplied at conductor 12. That signal is to be systematically monitored so as to identify the occurrence of a peak in its amplitude. As previously described, the peak is identified by comparing the input signal to stored quantities representing previous signal amplitudes. After the start pulse the initial stored signal is zero and that signal is repeatedly combined with a fixed bias quantity for comparison to the analog input signal.

The combination of the stored and bias signal is an algebraic combination, alternately the positive bias signal and then the negative bias signal. The summation is accomplished in the summing junction 23. The alternately summed signals are supplied in sequence as an input to comparator 24 while the input analog signal is continuously supplied as the second input. In the comparator the two signals are compared and, when the previously described criteria have been satisfied, output signals are supplied to the logic circuit 25.

The signals supplied to the summing junction 23 are the signals on conductors 31 and 32 of FIG. 2 and constitute, respectively, the quantity from converter 26 and the signal from one of a pair of gates 33 (normally open) or 34 (normally closed). For simplicity of description, it will be assumed that the input analog signal on conductor 12 has positive peaks, that the signal from the digital to analog converter 26 on conductor 31 is zero, having been reset, and further, that gate 34 is in its normally closed condition while gate 33 is normally open. In that beginning condition, the signal from an offset adjustor 35 will be supplied through gate 33 to conductor 32 and to the summing junction 23. The summing junction 23 performs a sequential algebraic summation of the two input signals and supplies an output to the comparator 24 representative of that summation.

With the signal on conductor 31 set at zero and the signal on conductor 32 at the offset value, in a negative polarity with respect to the input signal, there will be no positive output signal from the comparator until the analog signal on conductor 12 exceeds the value of the offset signal. So long as the input from the analog signal remains less than the offset, the peak height digitizer is in a fixed condition performing only a polarity testing function. When the input analog signal exceeds the offset signal and a positive signal is fed to the comparator 24, the comparator conditions the logic circuit 25 to supply a signal on conductor 36 to close the gate 33 and to supply a signal on conductor 37 to command the digital to analog converter 26 to increase its value to the value of the incoming analog signal. The converter continues to increase its value at a high speed, typically in less than 0.5 millisecond until the output from the summing junction 23 equals the input signal. When the converter 26 has attained the commanded signal or quantity, it then stores that quantity until it is further commanded. At this time, the logic circuit 25 supplies a signal on conductor 38 to change gate 34 from a normally closed to an open gate and thus to add a preadjusted bias from bias generator 39 through polarity control 41 and gate 34 to the summing junction 23 on conductor 32. The polarity control 41 changes the polarity of the bias supplied from bias generator 39 from plus to minus in accordance with a signal on conductor 42 supplied from the logic circuits 25. Reversal of polarity of the bias is accomplished at a constantly repeating rate in accordance with signals from a timing device 43 herein illustrated as 60 kc. clock. The comparator 24 therefore receives an input analog signal on conductor 12 and a signal from summing junction 23 constituting a stored signal from the converter and a bias signal varying between plus and minus at regular intervals in accordance with the signals from the pulsing clock 43. So long as the input signal remains within the limits of the stored value from the converter 26 plus or minus the value of the bias, the only action that the comparator 24 and the logic circuit 25 perform is to cause the bias to be switched in polarity with every clock pulse.

When the input signal on conductor 12 increases to become larger than the stored value plus the bias signal, a new command from comparator 24 is supplied to the logic circuits 25 and the logic circuit senses this signal increase and supplies a signal along conductor 44 to reinitiate a start pulse to the logic circuit 25 on conductor 28. The pulse on conductor 28 causes the system to repeat the previously described logic step and causes the digital to analog converter and storage to clear and then assume a new value in accordance with the input analog signal. So long as the input analog signal is increasing, a series of commands will occur along the conductors 44 and 28 from the logic circuit to reinitiate the logic function and to continue the repeated conversion of the analog signal to new digital quantities and the storage of the new quantity. It should be noted that each time the input signal exceeds the stored signal by the bias quantity, the logic circuit causes the converter to make a new reading and to start all over again.

When a peak is attained as is illustrated at 20 in FIG. 3 the logic circuit 25 will eventually be confronted with an indication that the input analog signal on conductor 12 has become less than the signal supplied on conductor 31 from the converter 26 minus the bias supplied on conductor 32 from the bias generator 39. When that condition occurs the logic circuit 25 provides a pulse on conductors 45 and 46 to supply a print command through normally open gate 47 to print command conductor 16. The printer 21 is then commanded to print the quantity within the storage section of the digital to analog converter and storage 26 as it appears on conductor 15. The printer of course, will also print the quantity representing the mass number as supplied on conductor 19, the mass number quantity being determined in a manner to be hereinafter described. The print command is also supplied to a delay circuit 48 on conductor 49 from the print command conductor 16.

The delay circuit interrupts the operation of the peak height digitizing functions until the printer 21 has had sufficient time to complete its printing operation. The digitizing operation of the present invention is initiated by pulses carried on conductor 28 and supplied whenever the logic 25 has identified a particular condition. Actually the logic 25 shuts itself off and then starts itself again with the pulse on conductor 28. The time delay 48 interrupts the immediate initiation of the operation by withholding the start pulse, and in so doing prevents any changes in the stored digital quantity as the printing is being accomplished.

The print command supplied on conductor 45, through gate 47 and on conductor 49 also actuates a flip-flop circuit 51 to supply a signal on conductor 52 to change the conditions of gate 47 to close that gate and thus block another print command until the circuit has been reset. The flip-flop circuit 51 further supplies a command on conductor 53 to a gate 54 to open that gate so that any further commands appearing on conductor 45 will pass through gate 54 to the start command conductor 28. Each time a pulse appears on conductor 28, the storage will be cleared and a new digital conversion of the input analog signal will be made and stored. As further comparisons are made between the input analog signal, the stored signal in the converter 26 and the signal from the bias generator 39, the logic circuit 25 will continue to detect an input analog signal that is less than the stored signal minus the bias, and subsequent repeat commands will be supplied to conductor 45 and be passed through gate 54 to cause the logic circuit to continue its repeated conversions. No new print commands can be supplied however, in that gate 47 is closed.

When the input analog signal changes its direction of slope and begins to increase in a positive direction, it will be compared to the quantity then stored in the converter 26 plus and minus the bias quantity from bias generator 39. When the input signal exceeds the stored signal plus the bias, the logic circuit 25 will again supply a command along conductor 44 to conductor 28 to the logic circuit. The command on conductor 44 will also appear on conductor 55 to return flip-flop 51 to its original condition and will cause gate 47 to be returned to a normally open condition and gate 54 to be changed to a normally closed condition. The logic circuit will then continue its comparison between the input analog signal and the stored quantity with the bias signal until it again recognizes the existence of a peak in the input signal whereupon a signal will be supplied upon conductor 45 to again command the printer 21 to print a digital quantity. Each print command will cause the time delay 48 to become effective and will actuate flip-flop 51. A device capable of performing the duty of the logic circuit 25 is illustrated in U.S. Patent 3,052,880, issued Sept. 4, 1962 to F. M. Young et al.

The mass number digitizer 18 is supplied with an analog signal representing a usually continuously varying voltage. That varying voltage may represent a variation in the electromagnetic field or the electrostatic field in the case of a mass spectrometer. The signal to the mass number digitizer may also be an analog signal from any other quantity that will represent the mass numbers identifying the particular ions striking the collector within the spectrometer. In the digitizer 18 the input analog signal is compared to a voltage from source 56 that may be adjustable to provide for the ranges of operation in the mass number digitizer. The analog sigal and the adjustable signal are supplied to a ratiometer 27 where the ratio of these two signals is digitized and continuously supplied to the printer 21 on conductor 19. The ratiometer functions as a digitizing comparator to supply digital signals to the printer when a print command appears on conductor 16 to actuate time delay 48 and when a blocking or "hold" signal is supplied on conductor 17 to the ratiometer 27. For the period of time delay 48 the ratiometer will not supply new signals to the printer 21; however, after the time has expired, the mass number signals will again be continuously supplied.

The input connections to the ratiometer, connected as shown in FIG. 2, will provide a digital output which is inversely proportional to the MS accelerating voltage. This is desirable for mass spectrometers that scan the spectrum by varying this voltage since then the digital ratiometer output is directly proportional to mass number.

The operation of the apparatus as illustrated in FIGS. 1 and 2 will now be described. With an input signal supplied along conductor 12 and a summation signal from summing junction 23, the comparator 24 supplies a signal to the logic circuit 25. The logic circuit will make a continuous sign test on the value of the input signal as compared to the signal from offset generator 35. If the sign test indicates a negative quantity, the logic circuit has then recognized that the input voltage is smaller than the offset and the logic circuit will remain in a sign test state. If, at some time, the input becomes larger than the offset, the result of the sign test will be positive and a pulse will appear on conductor 36 to convert gate 33 from normally open to normally closed and signals will appear on line 37 to command the digital to analog converter to increase its stored value to that of the analog input signal. When this has been accomplished a pulse will appear on conductor 38 to convert gate 34 from a normally closed to a normally open condition. Thereafter pulses will appear on conductor 42 at intervals determined by clock 43 to change repeatedly the polarity of the bias from bias generator 39 by the operation of polarity changer 41.

Thus after a positive quantity has been identified, the bias supplied on conductor 32 will be added to the signal appearing on conductor 31 and representing quantity stored in the analog digital converter 26. The sum of the two signals will be compared to the input analog signal. Subsequently the polarity of the bias signal will be reversed and the comparator will compare the input signal to the stored quantity minus the bias. The logic circuit will then follow the following systematic determinations:

(1) With a sign test positive and the bias positive, the logic circuit will command itself to make a new conversion and command the digital to analog converter and storage to assume the value now present on input line 12.

(2) With a test positive and the bias negative, the logic circuit will key the polarity controlling device 41 to reverse its polarity.

(3) With a sign test negative and the bias positive another signal will appear on conductor 42 to cause polarity controlling device 41 to change the polarity of the bias signal.

(4) With a sign test negative and the bias negative the print command will appear on conductor 45 and will be transmitted to conductor 16 to cause the printer 21 to print the quantity stored in the storage 26 along with a quantity from the mass number digitizer appearing on conductor 19.

In cases 2 and 3 the difference between the input signal and the summation signal is less than the bias, and the peak height digitizer continues to monitor this difference by continuously changing the bias polarity every clock pulse. In case 1, the input signal has increased by more than the bias and a complete new conversion is made. In case 4 the signal has decreased by more than the bias and the quantity stored in the analog to digital storage is as close to the actual peak height as is possible and is, therefore, displayed and printed out. The print-out command is carried to the delay circuit 48 to block changes in the signal supplied to the printer for the period of the time delay.

If the first comparison after the time delay has expired occurs on the down slope of an input signal and the signal continues to decrease, print commands would normally be generated in accordance with the logic described in case 4. The operation of the flip-flop 51 by a print command appearing on conductors 16 and 49, however, closes the gate 47 through conductor 52 and prevents further print commands from being carried to the printer until after a change in polarity of the input signal has been sensed. The change in operation of the logic circuit after a print-out command is as follows:

(5) With a sign test positive and bias positive, a reset pulse is supplied to the flip-flop 51 on conductor 55 from conductor 44 and the logic circuit is returned to its initial condition.

(6) With a sign test positive and the bias negative, a signal appears on conductor 42 to reverse the polarity of the bias signal.

(7) With a sign test negative and the bias positive, a signal appears on conductor 42 to reverse the polarity of the bias signal.

(8) With a sign test negative and the bias negative, a command is supplied on conductor 45 to continue the comparison of the input signal and the stored signal.

The overall result of this operation is that no print commands will be generated unless the peak height digitizer has first determined that the input signal has actually begun to increase again and second, that the top of another peak has been identified.

Figure 4:
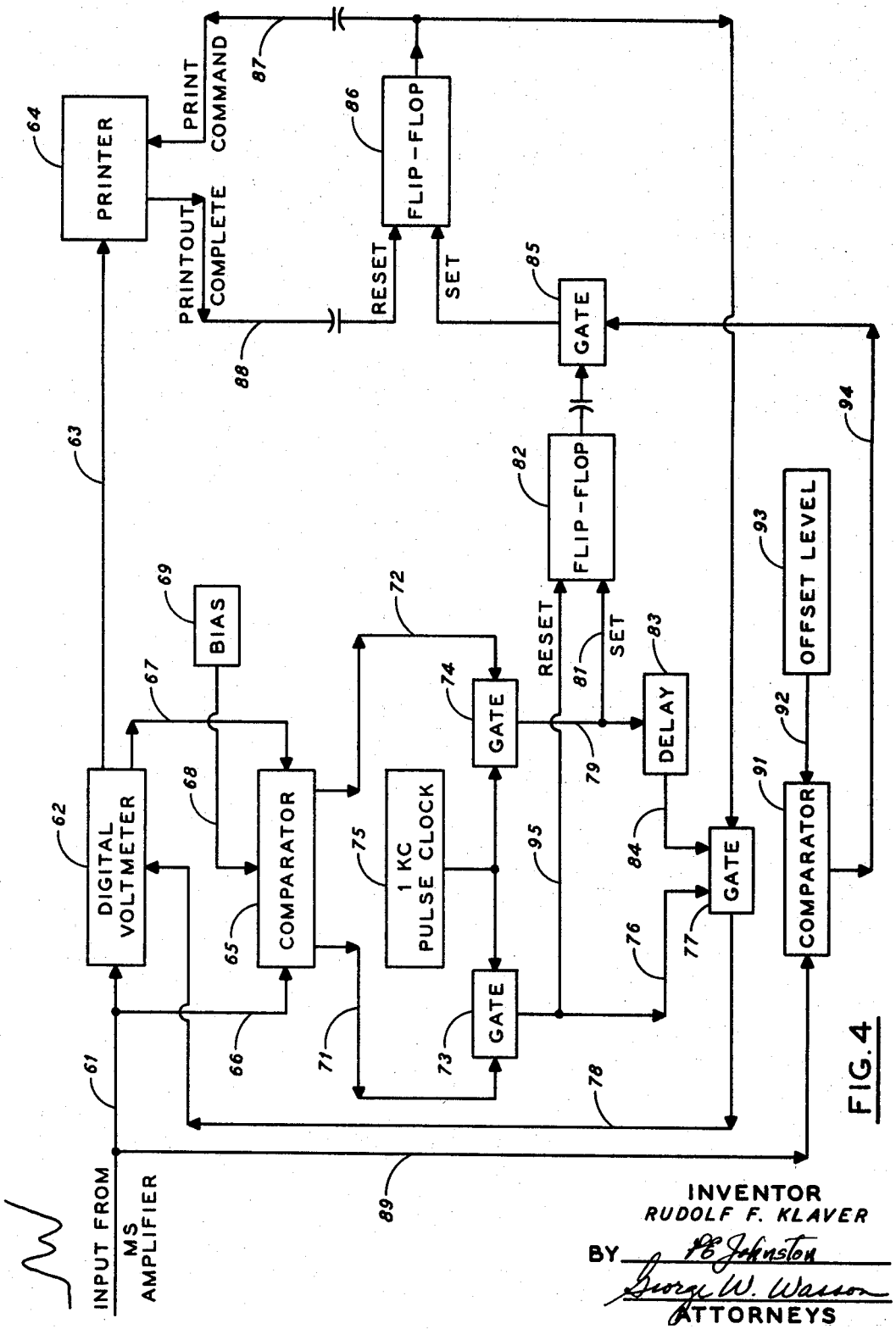
FIG. 4 is a block diagram illustration of an alternative form of apparatus for performing the method of the present invention.

FIG. 4 illustrates an alternative form of apparatus for performing the method of the present invention. Only the spectrum digitizer portion of the apparatus of FIG. 2 is illustrated in this figure; it should be understood that a mass number digitizer may be actuated by the print command signal derived from this apparatus. The mass spectrum signals appear on conductor 61 and actuate a digital voltmeter 62 to provide an output digital signal on conductor 63 to a printer 64. The printer requires a print command signal before it will record the input digital signals and the print command signal is supplied by the following apparatus operative to identify a peak in the input signal.

The peak identifying apparatus of FIG. 4 comprises a comparator 65 having an input mass spectrum signal on conductor 66, an input analog signal (proportional to the stored digital signal) on conductor 67 from the voltmeter 62 and an input bias signal on conductor 68 from the bias source 69. The comparator supplies a signal on conductor 71 when the input on conductor 66 is larger than the signal on conductor 67 plus the bias and a signal on conductor 72 when the input on conductor 66 is smaller than the signal on conductor 67 minus the bias. A signal on conductor 71 opens gate 73 allowing clock pulses from clock 75 to go through this gate; a signal on conductor 72 allows clock pulses to go through gate 74.

Taking first the operation of gate 73, when that gate is opened by a signal on conductor 71 indicating that the input mass spectrum signal has become larger than the stored digital signal plus the bias, a signal will be transmitted on conductor 76 to gate 77. Gate 77 is a normally open gate and will transmit the signal on through to conductor 78 to cause the digital voltmeter 62 to perform a new read function and to thus increase its stored quantity. Taking now gate 74, when a signal appears on conductor 72 indicating that the input mass spectrum signal has become less than the stored digital signal minus the bias, a signal will appear on conductor 79 to be supplied as a "set" signal on conductor 81 to a flip-flop 82. The signal on conductor 79 will also be supplied to a delay circuit 83 and, after an appropriate delay, will be supplied through conductor 84 to gate 77. If gate 77 is then open, the signal will be carried on conductor 78 to cause the voltmeter 62 to again make a new signal determination.

Actuation of the flip-flop 82 causes its circuit to perform two functions. First, it transmits a signal through gate 85 to a scond flip-flop 86, and second, it changes the condition of flip-flop 82 to block further "set" signals until the flip-flop has been returned to its original condition. Flip-flop 86 performs the same two functions by first transmitting a print command to conductor 87 and by changing its condition to block further signals until it has been returned to its original condition.

The print command on conductor 87 causes the printer 64 to record the signal supplied to it on conductor 63. When the recording has been completed, a signal will be supplied on conductor 88 to reset flip-flop 86. The print command signal on conductor 87 is also supplied to gate 77 to cause that gate to block further signals to the digital voltmeter so that the voltmeter cannot change its reading until the printer has completed its operation and the reset pulse has been supplied on conductor 88. The return of the flip-flop 86 to its original condition causes gate 77 to be returned to its open condition.

Gate 85 is controlled to establish a minimum signal level for actuation of the printer 64. To accomplish that purpose the input mass spectrum signal appears on conductor 89 and is supplied to a comparator 91. Also supplied to the comparator is an offset level signal on conductor 92 from offset source 93. If the signal on conductor 89 is greater than the signal on conductor 92, the comparator 91 will supply an output signal on conductor 94 to open gate 85 and thus permit it to pass print command signals. If the input mass spectrum signals are lower than a prescribed level, gate 85 will be closed and no print commands will appear.

After a print operation has been initiated by a signal on conductor 79 causing flip-flop 82 to be placed in its second condition, no further peak signals can be supplied to the printer until the flip-flop has been reset. A "reset" pulse is supplied on conductor 95 from gate 73 when the signal on conductor 71 indicates that the input spectrum signal has begun to exceed the previously stored voltmeter signal by an amount larger than the bias signal. When that condition exists the flip-flop 82 will be returned to its first condition and peak identifying signals may be passed to establish a print command signal on conductor 87.

While a certain preferred embodiment of the present invention has been specifically disclosed, it is to be understood that the invention is not limited thereto, as many variations will be readily apparent to those skilled in the art and the invention is to be given its broadest possible interpretation within the terms of the following claim:

What is claimed is:

1. Apparatus for identifying a peak amplitude value of signals within a time varying signal comprising in combination:

(a) means for sensing the instantaneous value of said time varying signal,
(b) means for storing sensed values of said time varying signal,
(c) means for selecting an initial value of said time varying signal above a fixed amplitude value including means for energizing said storing means with said initial value,
(d) a source of bias signal and means for repeatedly reversing the polarity of said bias signal,
(e) a summing means and means for energizing said summing means with said bias signal and said stored signal, said summing means including means for producing an output signal constituting said stored signal and said repeatedly reversing bias signal, to produce alternately an added signal and a difference signal,
(f) a comparison means and circuit means for energizing said comparison means with said sensed instantaneous value of said time varying signal and alternately said added signal and said difference signal, said comparison means including means for producing an output signal resulting from said comparison,
(g) a logic circuit including means for sensing sequentially the polarity of said comparison means output signals and means for (1) energizing said storing means with the sensed instantaneous value of said time varying signal when said comparison means output signal is of one polarity when said output signal represents comparison of said added signal and said sensed instantaneous value of said time varying signal (2) and for withdrawing said stored value as a peak amplitude value within said time varying signal when said comparison means output signal is of the opposite polarity when said output signal represents comparison of said difference signal and said sensed instantaneous value of said time varying signal,
(h) and printing means actuated by said logic circuit upon sensing of said output signal of said opposite polarity for withdrawing of said stored value so as to produce a printed record of said withdrawn value as said identified peak amplitude value of signals within said time varying signal.

References Cited

UNITED STATES PATENTS 2,845,597   7/1958   Perkins _____ 324—103
3,221,253   11/1965  Keyes _____ 324—103

RUDOLPH V. ROLINEC, *Primary Examiner.*

E. F. KARLSEN, *Assistant Examiner.*